Jan. 5, 1926. 1,568,291

F. NOTZ ET AL

DOUGH MIXING MACHINE

Filed Jan. 5, 1925 2 Sheets-Sheet 1

Inventors
Felix Notz & George Royan,
By Fisher, Lowe, Clapp & Soans.
Attys.

Jan. 5, 1926.  1,568,291
F. NOTZ ET AL
DOUGH MIXING MACHINE
Filed Jan. 5, 1925   2 Sheets-Sheet 2

Inventors:
Felix Notz & George Royan,
By Fisher, Fowle, Clapp & Soans
Attys.

Patented Jan. 5, 1926.

1,568,291

UNITED STATES PATENT OFFICE.

FELIX NOTZ AND GEORGE ROYAN, OF CHICAGO, ILLINOIS, ASSIGNORS TO AMERICAN OVEN & MACHINE COMPANY, OF CHICAGO, ILLINOIS, A CORPORATION OF ILLINOIS.

DOUGH-MIXING MACHINE.

Application filed January 5, 1925. Serial No. 482.

*To all whom it may concern:*

Be it known that we, FELIX NOTZ and GEORGE ROYAN, citizens of the United States, residing at Chicago, in the county of Cook and State of Illinois, have invented certain new and useful Improvements in Dough-Mixing Machines, of which we do declare the following to be a full, clear, and exact description, reference being had to the drawings accompanying this specification.

The present invention relates more particularly to that class of dough mixing machines in which a plurality of revoluble mixing frames or blades are arranged within the mixing chamber, these arms or blades being located one within the other and being adapted to revolve at different distances from the axis of revolution. An example of this type of machine is shown in Letters Patent No. 831,372, granted for an invention of F. Notz and J. McBriar, September 18, 1906.

In the machine of said Notz and McBriar patent, the mixing of the dough in the mixing chamber is effected by means of two revoluble arms, one mounted within the other, these arms being driven by suitable gearing that imparts revolution to the arms in the same direction but at different rates of speed. Inasmuch as the mechanism for driving the revoluble mixing frames or blades of our present invention may be the same as the driving mechanism shown in said Notz and McBriar patent, it is not deemed necessary to illustrate such driving mechanism in the accompanying drawings.

The present invention is directed more particularly to the improvement of the shape of the mixing frames with a view to effecting rapid and thorough mixing of the ingredients of the batch of dough while imparting thereto the desired character and quality. The invention consists in the features of novelty hereinafter described, illustrated in the accompanying drawings and particularly pointed out in the claims at the end of the specification.

A designates the mixing chamber which is of familiar shape, and within this chamber are mounted the inner and outer frames B and C whereby the ingredients to form the dough will be mixed. The inner frame C is shown as having its end members $c$ fixed to the stub shafts or trunnions $d$ and $d'$ that pass through the sleeves E and E', to which are fixed the end members of the outer frame B. Suitable gearing, preferably similar to that shown in the Notz and McBriar patent above mentioned, will be connected to the trunnions, $d$, $d'$, and to sleeves E, E', this gearing being such as will serve to impart revolution to the mixing frames B and C in the same direction. Preferably the gearing will be of such character that the outer and inner mixing frames B and C will be driven in the same direction but at different speeds, the outer frame being driven say at 55 revolutions per minute, while the inner frame is driven at 65 revolutions per minute.

The construction of the outer mixing frame B is similar to that set forth in Patent No. 1,537,259, granted to us May 12, 1925. This outer frame B comprises longitudinal arms $B^2$, $B^3$, that are joined to the end members of the frame. Each of these end members comprises preferably a long bar $b$ and a short bar $b'$. The bars $b$ and $b'$ on each side of the longitudinal center of the frame B are formed with concave working surfaces $b^2$ and $b^3$ respectively, both of these concave surfaces being upon the front or working face of the frame. The diagonally opposite corners X and X' of the mixing frame B are curved in opposite directions from an imaginary plane bisecting the mixing frame B through the center of the sleeves E and E' and through the shorter bars $b'$ of the end members. The parts of the mixing frame B upon opposite sides of its center of revolution are identical in shape.

Figure 1:
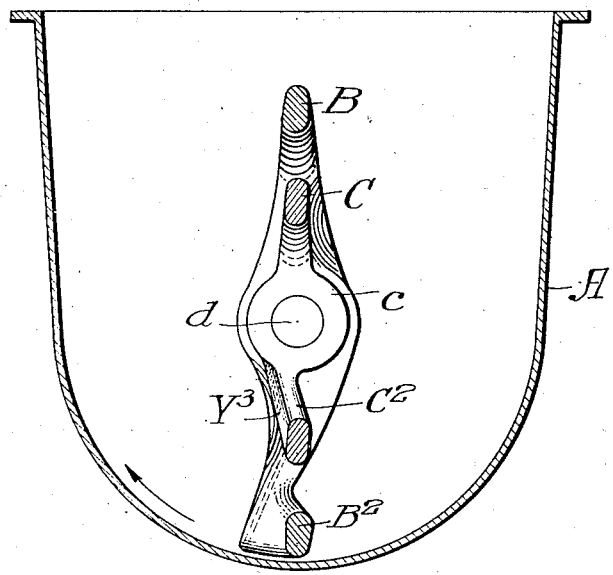
Fig. 1 is a view in vertical section on line 1—1 of Fig. 2, through a mixing machine embodying our invention.
Figure 2:
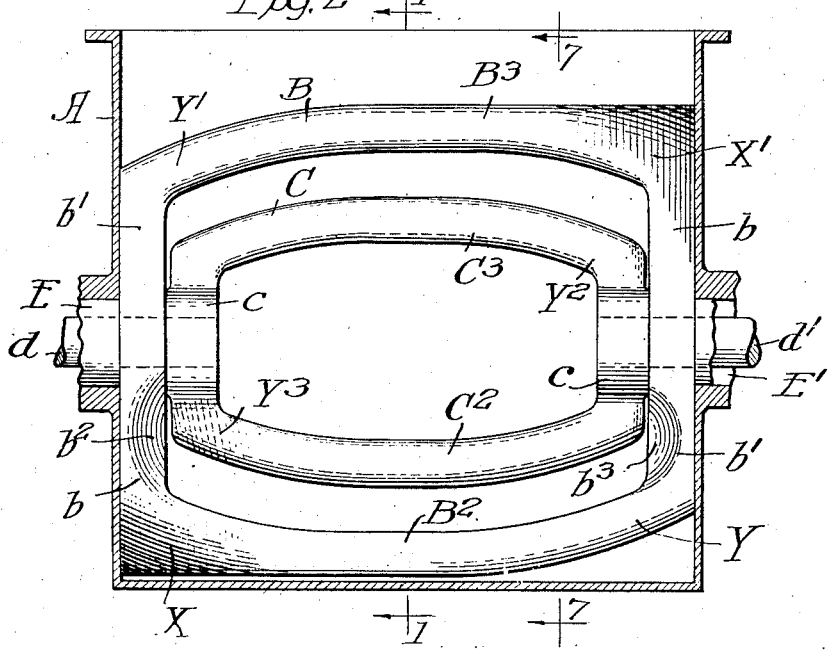
Fig. 2 is a view in central, longitudinal section through the mixing chamber, the mixing frames being shown in elevation.

Each of the arms $B^2$ and $B^3$ of the outer mixing frame extends in a line approximately parallel with the axis of the mixing frame to a point about midway the length of such arms (see Fig. 2) and from such point the arms curve gradually inwardly to their points of union with the shorter bars $b'$ of the mixing frame, as at the corners Y and Y' of the frame. It will thus be seen that the path of travel of approximately one-half of each of the arms $B^2$ and $B^3$ is in proximity to the walls of the mixing chamber A, while the path of travel of the inwardly curved portions of the arms $B^2$ and $B^3$ is some distance from such walls of the mixing chamber.

Figure 3:
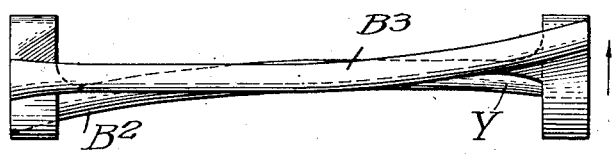
Fig. 3 is a plan or edge view of the outer mixing frame.

As shown in Fig. 3 of the drawing, each of the arms $B^2$ and $B^3$ is slightly bowed or concave in the direction of travel, these arms extending axially for about one-half their length, and for the remainder of their length being curved or bowed in the direction of travel to their point of union with the long bars $b$ of the end members of the frame. The curved working face of each of the arms $B^2$ and $B^3$ at the diagonally opposite corners X and X' of the outer mixing frame merge into the concave working surfaces $b^2$ of the long bars $b$ of the end members of the frame, so that the curved working faces of the longitudinal arms cooperate with the curved or inclined working faces of these end members to shift the dough alternately in opposite directions as the mixing frame revolves.

Figure 4:
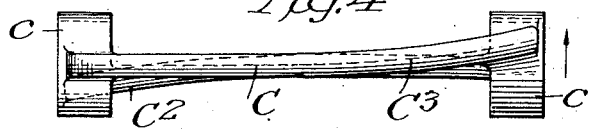
Fig. 4 is a similar plan or edge view of the inner mixing frame.
Figure 5:
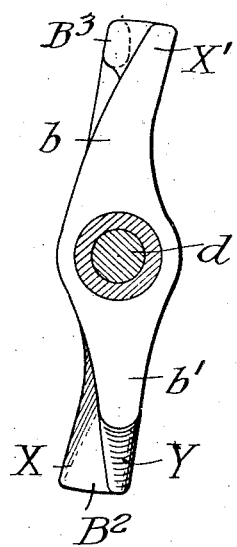
Fig. 5 is an end view of the outer mixing frame.
Figure 6:
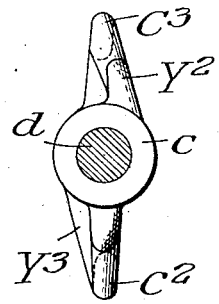
Fig. 6 is a similar end view of the inner mixing frame.
Figure 7:
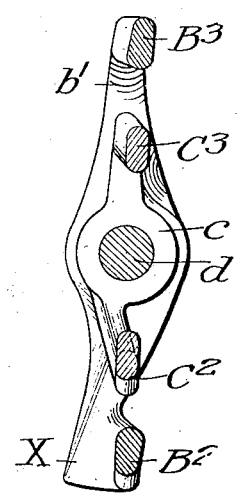
Fig. 7 is a view in vertical section on line 7—7 of Fig. 2.

The shape of the inner mixing frame C, while similar to that of the inner mixing frame shown in the above mentioned Notz and McBrair patent, differs therefrom notably in the following respect: Each of the longitudinal arms $C^2$ and $C^3$ of the inner mixing frame extends, as most clearly seen in Fig. 4, for about one-half its length in line with the axis of the frame, but from about its central portion each of the arms $C^2$ and $C^3$ is gradually curved in forward direction, i. e., in the direction of travel, to its point of union with the end members or hubs $c$ of this frame. This point of union of the curved portion of the arms $C^2$ and $C^3$ with the hubs or end members of the inner mixing frame is eccentric or off-set in forward direction, as clearly shown in Figs. 4, 6 and 7 of the drawings. It is thus seen that at its diagonally opposite corners $Y^2$ and $Y^3$, the inner mixing frame C is curved in forward direction and in correspondence with the curved portions of the corners X and X' of the outer mixing frame above described. As the result of this construction of the inner mixing frame C, the dough being mixed and kneaded will be shifted by the forwardly curved, diagonally opposite corners of the inner mixing frame towards the center of the mixing chamber. The inner mixing frame of the said Notz and McBriar patent had its longitudinal arms extending axially from end to end and as a consequence these arms did not serve to shift the dough back and forth, as with our present construction.

The concave or inclined working surfaces $b^2$ and $b^3$ of the end members of the outer mixing frame B, not only serve to remove the dough from the end walls of the mixing chamber, but serve also to move this dough towards the center of the chamber and into the path of the arms of the inner mixing frame C.

From the foregoing description it will be seen that when revolution is imparted to the inner and outer mixing frames B and C in the same direction, both of these frames will serve not only to effectively mix the dough as with the construction set forth in the before mentioned Notz and McBrair patent, but will serve more effectively to shift the entire mass of dough back and forth and by so doing to materially expedite the thorough mixing and working of the dough.

We claim as our invention:

1. In a dough mixing machine, the combination with a mixing chamber of a pair of mixing frames mounted to revolve one within the other, each of said frames comprising longitudinal arms and end members to which said arms are joined; each of said frames having two diagonally opposite corner portions with forwardly inclined working faces disposed in planes at an angle to the axis of the beater frames and adapted to shift the dough back and forth in axial direction.

2. In a dough mixing machine, the combination with a mixing chamber of a pair of mixing frames mounted to revolve one within the other, each of said frames comprising longitudinal arms and end members to which said arms are joined; each of said frames having two diagonally opposite corner portions forwardly inclined with respect to the general plane of the beater and at an angle to the axis of the beater frames, the diagonally inclined corners of both of said frames being inclined forwardly with respect to the path of movement of said frames in the same direction, whereby in operation the dough is shifted by both frames back and forth in axial direction.

3. In a dough mixing machine, the combination with a mixing chamber of a pair of mixing frames mounted to revolve one within the other, each of said frames comprising longitudinal arms and end members to which said arms are joined, the inner frame having its arms extending to about midway their length in a substantially axial direction and having one end of each of said arms, at diagonally opposite corners of the frame, inclined forwardly with respect to the path of movement of said frame, and at an angle to the axis of said frame.

4. In a dough mixing machine, the combination with a mixing chamber of a pair of mixing frames mounted to revolve one within the other, each of said frames comprising longitudinal arms and end members to which said arms are joined; the outer frame having its arms extending to about midway their length in a substantially axial direction and throughout the remainder of their length inclined towards the axis of said frame and having two diagonally opposite corner portions inclined forwardly with respect to the path of movement of the frame; the inner frame having two diagonally opposite corner portions inclined forwardly with respect to the path of movement of said frame, said diagonally opposite corner portions of said inner frame being inclined in the same direction as the inclined corner portions of the outer frame, and at an angle to the axis of said frame.

5. In a dough mixing machine, the combination with a mixing chamber of a pair of mixing frames mounted to revolve one within the other, each of said frames comprising longitudinal arms and end members to which said arms are joined, the end members of the outer frame having inwardly inclined working surfaces to move the dough towards the inner frame.

6. In a dough mixing machine, the combination with a mixing chamber of a pair of mixing frames mounted to revolve one within the other, each of said frames comprising longitudinal arms and end members to which said arms are joined, the end members of the outer frame comprising bars of different lengths on each side of its longitudinal center, and all of said bars having inwardly inclined working surfaces.

FELIX NOTZ.
GEORGE ROYAN.